United States Patent
Jiang et al.

(10) Patent No.: US 11,488,329 B2
(45) Date of Patent: Nov. 1, 2022

(54) METHOD AND APPARATUS FOR MULTI-RATE NEURAL IMAGE COMPRESSION WITH STACKABLE NESTED MODEL STRUCTURES

(71) Applicant: TENCENT AMERICA LLC, Palo Alto, CA (US)

(72) Inventors: Wei Jiang, Sunnyvale, CA (US); Wei Wang, San Jose, CA (US); Shan Liu, San Jose, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 23 days.

(21) Appl. No.: 17/348,894

(22) Filed: Jun. 16, 2021

(65) Prior Publication Data

US 2021/0407146 A1 Dec. 30, 2021

Related U.S. Application Data

(60) Provisional application No. 63/045,342, filed on Jun. 29, 2020.

(51) Int. Cl.
*G06T 9/00* (2006.01)
(52) U.S. Cl.
CPC .................. *G06T 9/002* (2013.01)
(58) Field of Classification Search
CPC ........................................ G06T 9/002
USPC ....................................... 382/233
See application file for complete search history.

(56) References Cited

U.S. PATENT DOCUMENTS

| | | |
|---|---|---|
| 2013/0297542 A1 | 11/2013 | Piekniewski et al. |
| 2019/0124346 A1 | 4/2019 | Ren et al. |
| 2020/0304147 A1* | 9/2020 | Choi .................. H03M 7/3059 |
| 2021/0042606 A1* | 2/2021 | Bai ..................... G06N 3/0445 |

OTHER PUBLICATIONS

International Search Report dated Sep. 30, 2021 in International Application No. PCT/US2021/038476.
Written Opinion of the International Searching Authority dated Sep. 30, 2021 in International Application No. PCT/US2021/038476.
Balle et al., "Variational Image Compression with a Scale Hyperprior", Cornell University Library/Electrical Engineering and Systems Science/Image and Video Processing, May 1, 2018 https://arxiv.org/abs/1802.01436 (23 pages total).

(Continued)

*Primary Examiner* — Allen C Wong
(74) *Attorney, Agent, or Firm* — Sughrue Mion, PLLC

(57) ABSTRACT

A method of multi-rate neural image compression with stackable nested model structures is performed by at least one processor and includes iteratively stacking, on a first prior set of weights of a first neural network corresponding to a prior hyperparameter, a first plurality of sets of weights of a first plurality of stackable neural networks corresponding to a current hyperparameter, wherein the first prior set of weights of the first neural network remains unchanged, encoding an input image to obtain an encoded representation, using the first prior set of weights of the first neural network on which the first plurality of sets of weights of the first plurality of stackable neural networks is stacked, and encoding the obtained encoded representation to determine a compressed representation.

20 Claims, 8 Drawing Sheets

(56) References Cited

OTHER PUBLICATIONS

Chen et al., "Neural Image Compression via Non-Local Attention Optimization and Improved Context Modeling", Cornell University Library/Electrical Engineering and Systems Science/Image and Video Processing, Oct. 11, 2019, https://arxiv.org/abs/1910.06244 (13 pages total).

\* cited by examiner

METHOD AND APPARATUS FOR MULTI-RATE NEURAL IMAGE COMPRESSION WITH STACKABLE NESTED MODEL STRUCTURES

CROSS-REFERENCE TO RELATED APPLICATIONS

This application is based on and claims priority to U.S. Provisional Patent Application No. 63/045,342, filed on Jun. 29, 2020, the disclosure of which is incorporated by reference herein in its entirety.

BACKGROUND

Standard groups and companies have been actively searching for potential needs for standardization of future video coding technology. These standard groups and companies have focused on artificial intelligence (AI)-based end-to-end neural image compression (NIC) using deep neural networks (DNNs). The success of this approach has brought more and more industrial interest in advanced neural image and video compression methodologies.

Flexible bitrate control remains a challenging issue for previous NIC methods. Conventionally, it may include training multiple model instances targeting each desired trade-off between a rate and a distortion (a quality of compressed images) individually. All these multiple model instances may need to be stored and deployed on a decoder side to reconstruct images from different bitrates. This may be prohibitively expensive for many applications with limited storage and computing resources.

SUMMARY

According to embodiments, a method of multi-rate neural image compression with stackable nested model structures is performed by at least one processor and includes iteratively stacking, on a first prior set of weights of a first neural network corresponding to a prior hyperparameter, a first plurality of sets of weights of a first plurality of stackable neural networks corresponding to a current hyperparameter, wherein the first prior set of weights of the first neural network remains unchanged, encoding an input image to obtain an encoded representation, using the first prior set of weights of the first neural network on which the first plurality of sets of weights of the first plurality of stackable neural networks is stacked, and encoding the obtained encoded representation to determine a compressed representation.

According to embodiments, an apparatus for multi-rate neural image compression with stackable nested model structures, includes at least one memory configured to store program code, and at least one processor configured to read the program code and operate as instructed by the program code. The program code includes first stacking code configured to cause the at least one processor to iteratively stack, on a first prior set of weights of a first neural network corresponding to a prior hyperparameter, a first plurality of sets of weights of a first plurality of stackable neural networks corresponding to a current hyperparameter, wherein the first prior set of weights of the first neural network remains unchanged, first encoding code configured to cause the at least one processor to encode an input image to obtain an encoded representation, using the first prior set of weights of the first neural network on which the first plurality of sets of weights of the first plurality of stackable neural networks is stacked, and second encoding code configured to cause the at least one processor to encode the obtained encoded representation to determine a compressed representation.

According to embodiments, a non-transitory computer-readable medium stores instructions that, when executed by at least one processor for multi-rate neural image compression with stackable nested model structures, cause the at least one processor to iteratively stack, on a first prior set of weights of a first neural network corresponding to a prior hyperparameter, a first plurality of sets of weights of a first plurality of stackable neural networks corresponding to a current hyperparameter, wherein the first prior set of weights of the first neural network remains unchanged, encode an input image to obtain an encoded representation, using the first prior set of weights of the first neural network on which the first plurality of sets of weights of the first plurality of stackable neural networks is stacked, and encode the obtained encoded representation to determine a compressed representation.

DETAILED DESCRIPTION

The disclosure describes methods and apparatuses for compressing an input image by a multi-rate NIC model with stackable nested model structures. Only one NIC model instance is used to achieve image compression at multiple bitrates.

Figure 1:
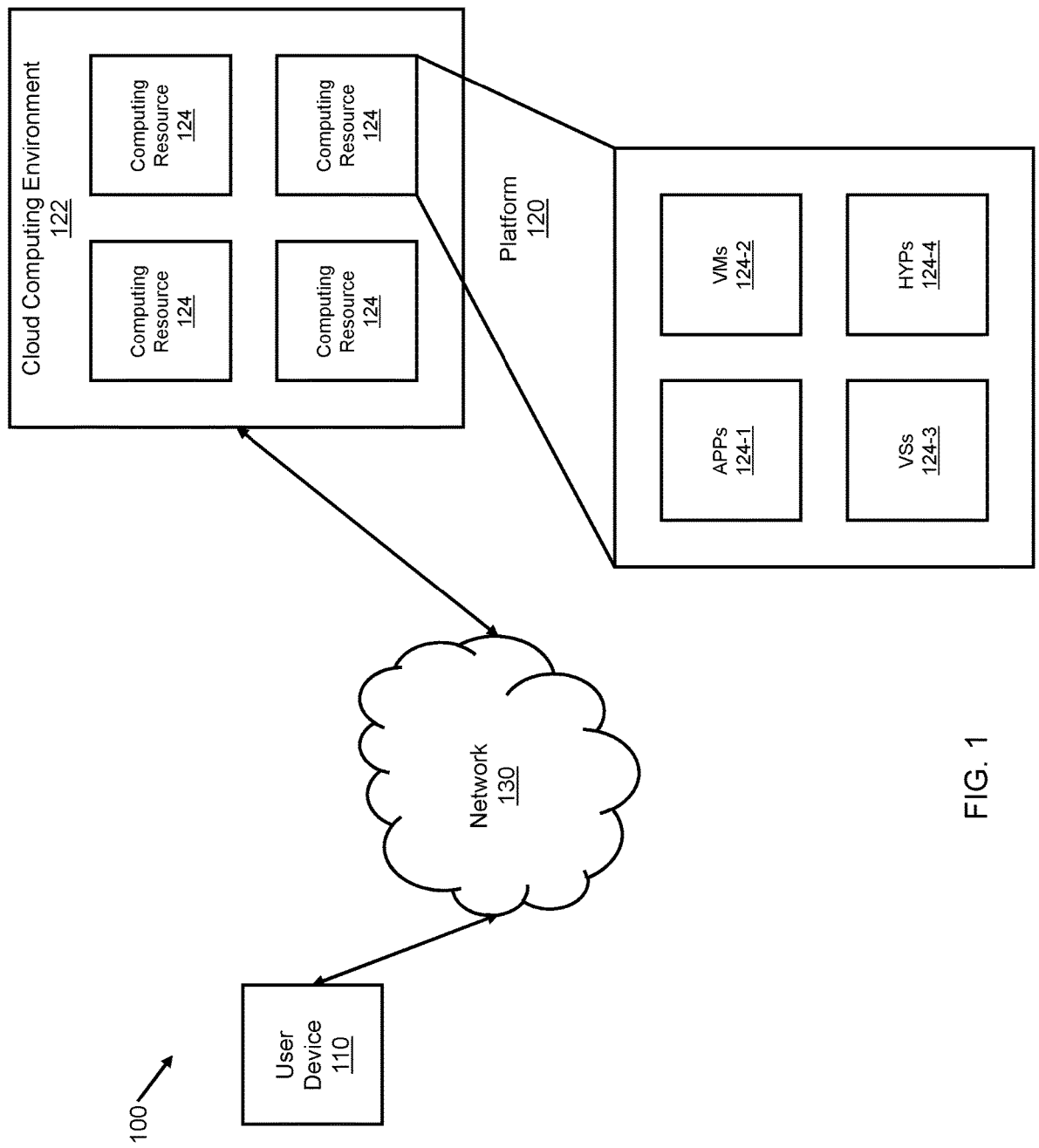
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
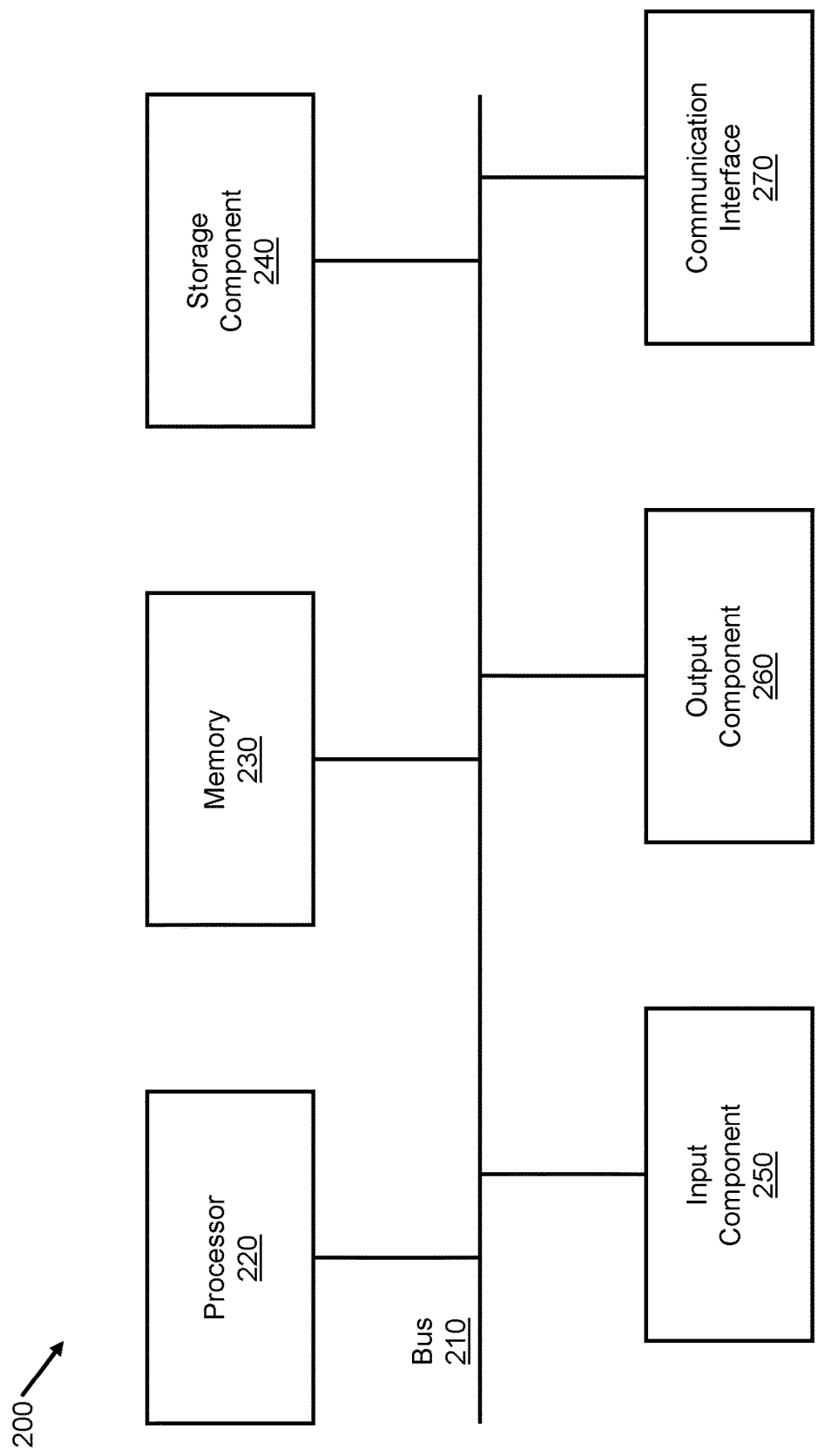
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Methods and apparatuses for multi-rate neural image compression with stackable nested model structures will now be described in detail.

This disclosure describes a multi-rate NIC framework for learning and deploying only one NIC model instance that supports multi-rate image compression. A stackable nested model structure for both encoder and decoder is described, in which encoding or decoding modules are stacked progressively to achieve higher and higher bitrate compression results.

Figure 3:
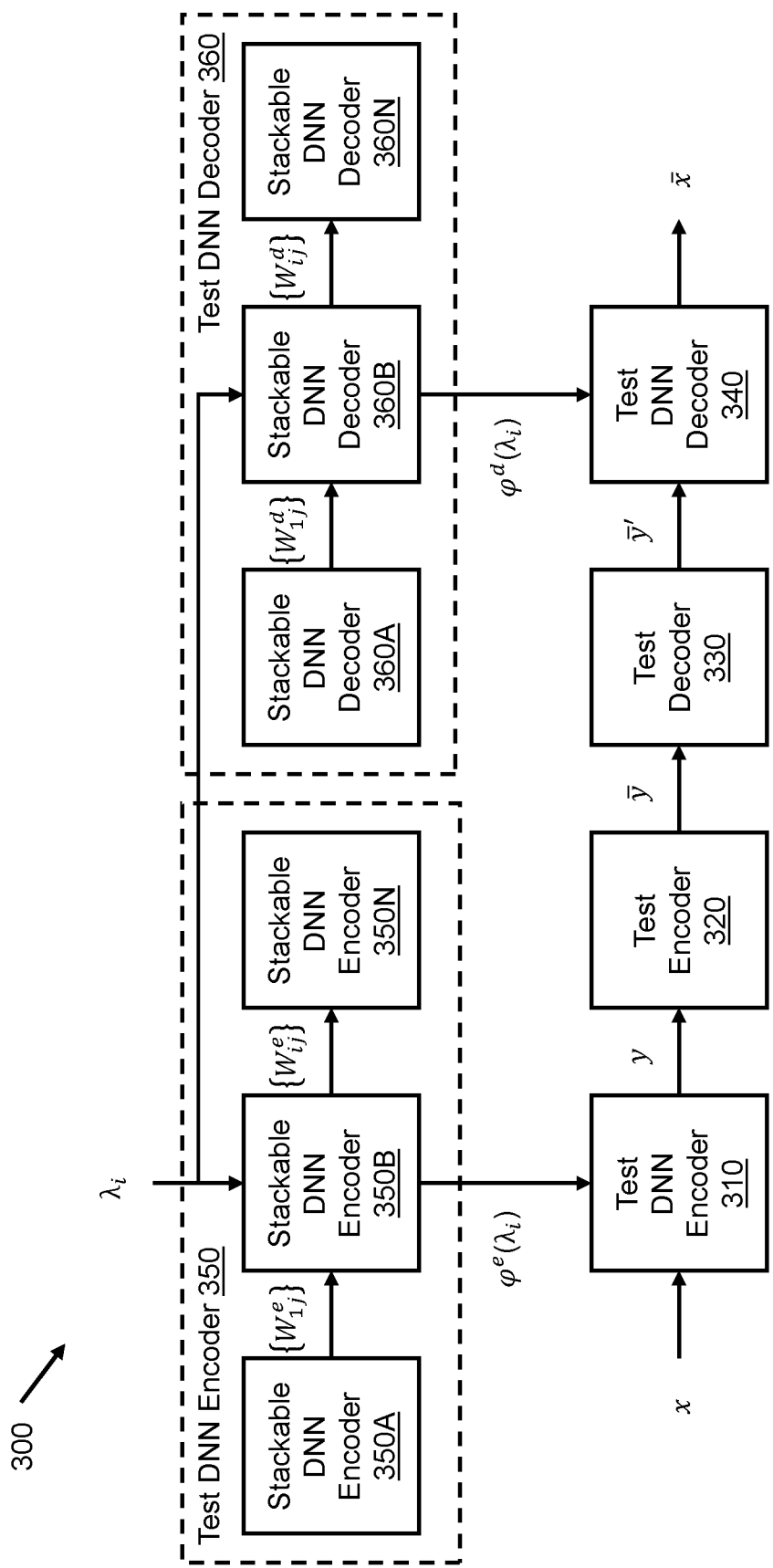
FIG. 3 is a block diagram of a test apparatus for multi-rate neural image compression with stackable nested model structures, during a test stage, according to embodiments.

FIG. 3 is a block diagram of a test apparatus 300 for multi-rate neural image compression with stackable nested model structures, during a test stage, according to embodiments.

As shown in FIG. 3, the test apparatus 300 includes a test DNN encoder 310, a test encoder 320, a test decoder 330, a test DNN decoder 340, a test DNN encoder 350 and a test DNN decoder 360. The test DNN encoder 350 includes stackable DNN encoders 350A, 350B, . . . , and 350N, and the test DNN decoder 360 includes stackable DNN decoders 360A, 360B, . . . , and 360N.

Given an input image x of size (h,w,c), where h, w, c are the height, width, and number of channels, respectively, the target of the test stage of an NIC workflow can be described as follows. A compressed representation $\bar{y}$ that is compact for storage and transmission is computed. Then, based on the compressed representation $\bar{y}$, an image $\bar{x}$ is reconstructed, and the reconstructed image $\bar{x}$ should be similar to the original input image x.

The process of computing the compressed representation $\bar{y}$ is separated into two parts. One, a DNN encoding process uses the test DNN encoder 310 to encode the input image x into a DNN-encoded representation y. Two, an encoding process uses the test encoder 320 to encode (perform quantization and entropy coding on) the DNN-encoded representation y into the compressed representation $\bar{y}$.

Accordingly, the decoding process is separated into two parts. One, a decoding process uses the test decoder 330 to decode (performing decoding and dequantization on) the compressed representation $\bar{y}$ into a recovered representation $\bar{y}'$. Two, a DNN decoding process uses the test DNN decoder 340 to decode the recovered representation $\bar{y}'$ into the reconstructed image $\bar{x}$. In this disclosure, there is not any restriction on the network structures of the test DNN encoder 310 used for DNN encoding or the test DNN decoder 340 used for DNN decoding. There is not any restriction on the methods (the quantization methods and the entropy coding methods) used for encoding or decoding either.

To learn the NIC model, two competing desires are dealt with: better reconstruction quality versus less bits consumption. A loss function D (x, $\bar{x}$) is used to measure the reconstruction error, which is called the distortion loss, such as the peak signal-to-noise-ratio (PSNR) and/or structural similarity index measure (SSIM), between the images x and $\bar{x}$. A rate loss R($\bar{y}$) is computed to measure the bit consumption of the compressed representation $\bar{y}$. Therefore, a trade-off hyperparameter $\lambda$ is used to optimize a joint rate-distortion (R-D) loss:

$$L(x, \bar{x}, \bar{y}) = D(x, \bar{x}) + \lambda R(\bar{y}) \qquad (1)$$

Training with a large hyperparameter $\lambda$ results in compression models with smaller distortion but more bits consumption, and vice versa. For each pre-defined hyperparameter $\lambda$, an NIC model instance will be trained, which will not work well for other values of the hyperparameter $\lambda$. Therefore, to achieve multiple bit rates of a compressed stream, traditional methods may require training and storing multiple model instances.

In this disclosure, one single trained model instance of the NIC network is used to achieve multi-rate NIC, with a stackable nested model structure. The NIC network contains multiple stackable nested model structures, each progressively stacked on to target a different value of the hyperparameter $\lambda$. Specifically, let $\lambda_1, \ldots, \lambda_N$ denote N hyperparameters that are ranked in descending order, corresponding to compressed representations with decreasing distortion (increasing quality) and increasing rate loss (decreasing bit rates). Let $\bar{y}_i$ and $\bar{x}_i$ denote the compressed representation and reconstructed image corresponding to the hyperparameter $\lambda_i$, respectively. Let $\sigma^e(\lambda_i)$ denote a set of weight coefficients of the test DNN encoder 310 targeting the hyperparameter $\lambda_i$. $\sigma^e(\lambda_i) = \{\sigma^e(\lambda_{i-1}), \{W_{ij}^e\}\}$ for the NIC model. Similarly, let $\sigma^d(\lambda_i)$ denote a set of weight coefficients of the test DNN decoder 340 targeting the hyperparameter $\lambda_i$. $\sigma^d(\lambda_i) = \{\sigma^d(\lambda_{i-1}), \{W_{ij}^d\}\}$. $\{W_{ij}^e\}$ is the set of weight coefficients of the stackable DNN encoder 350A, 350B, ..., or 350N for the hyperparameter $\lambda_i$ that are stacked on top of the test DNN encoder 310 for the hyperparameter $\lambda_{i-1}$. $\{W_{ij}^d\}$ is the set of weight coefficients of the stackable DNN decoder 360A, 360B, ..., or 360N for the hyperparameter $\lambda_i$ that are stacked on top of the test DNN decoder 340 for the hyperparameter $\lambda_{i-1}$. Each $W_{ij}^e(W_{ij}^d)$ is the weight coefficients of the j-th layer of the stackable DNN encoder 350A, 350B, ..., or 350N (the stackable DNN decoder 360A, 360B, ..., or 360N) for the test DNN encoder 310 (the test DNN decoder 360). Also, the stackable DNN encoders 350A, 350B, ..., and 350N and the stackable DNN decoders 360A, 360B, ..., and 360N for each value of the hyperparameter $\lambda_i$ can have different DNN structures. In this disclosure, there is not any restriction on the underlying DNN encoder/decoder network models.

FIG. 3 gives the overall workflow of the test stage of the method. Given an input image x, and given a target hyperparameter $\lambda_i$, the test DNN encoder 310 computes the DNN encoded representation y, using the set of weight coefficients $\sigma^e(\lambda_i)$. Then, the compressed representation $\bar{y}$ is computed by the test encoder 320 in the encoding process. Based on the compressed representation $\bar{y}$, the recovered representation $\bar{y}'$ can be computed through the DNN decoding process using the test decoder 330. Using the hyperparameter $\lambda_i$, the test DNN decoder 340 computes the reconstructed image $\bar{x}$ based on the recovered representation $\bar{y}'$, using the set of weight coefficients $\sigma^d(\lambda_i)$.

Figure 4:
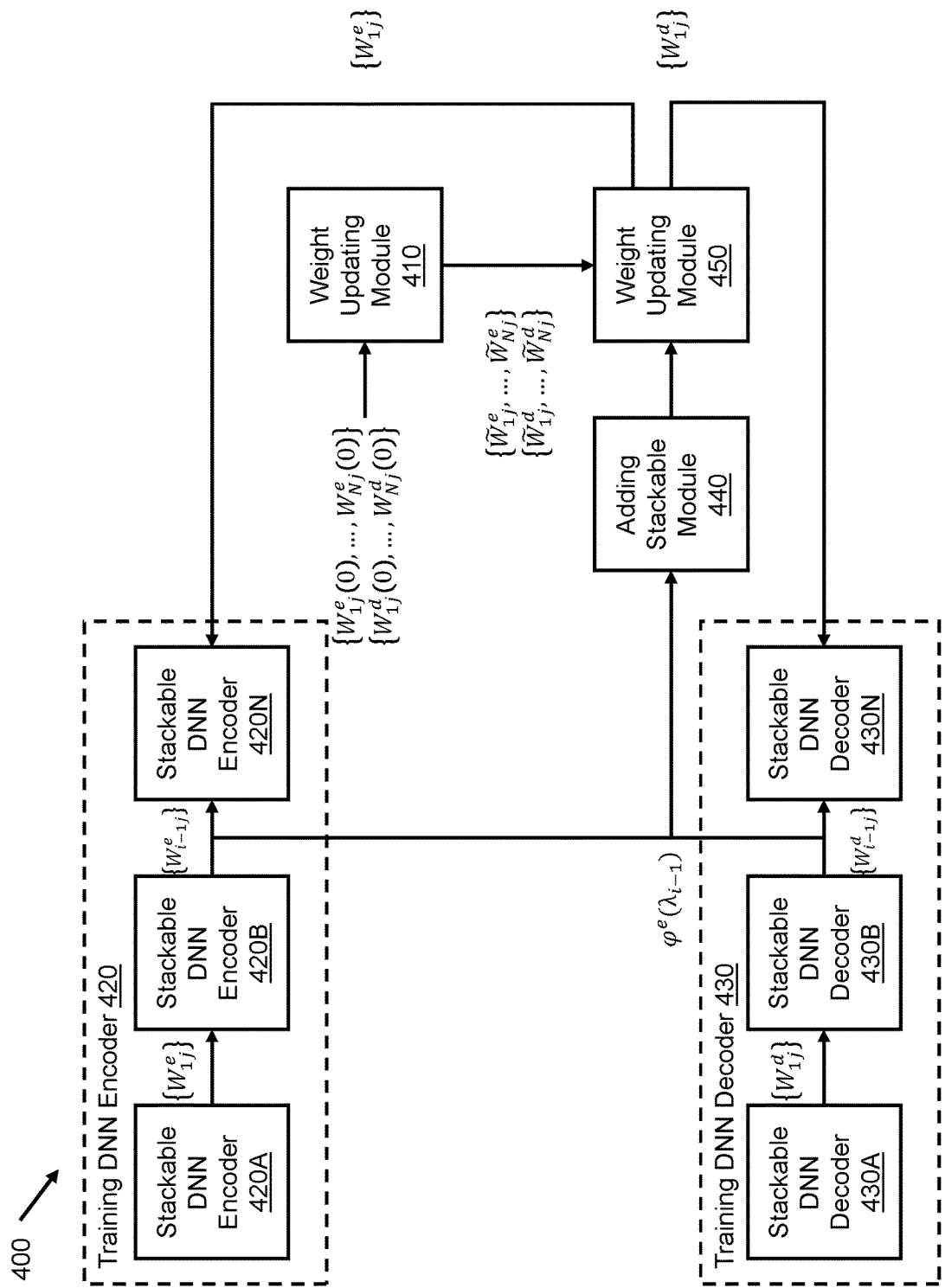
FIG. 4 is a block diagram of a training apparatus for multi-rate neural image compression with stackable nested model structures, during a training stage, according to embodiments.

FIG. 4 is a block diagram of a training apparatus 400 for multi-rate neural image compression with stackable nested model structures, during a training stage, according to embodiments.

As shown in FIG. 4, the training apparatus 400 includes a weight updating module 410, a training DNN encoder 420, a training DNN decoder 430, an adding stackable module 440 and a weight updating module 450. The training DNN encoder 420 includes stackable DNN encoders 420A, 420B, ..., and 420N, and the training DNN decoder 430 includes stackable DNN decoders 430A, 430B, ..., and 430N.

FIG. 4 gives the overall workflow of the training stage of the method. The goal is to learn the nested weights $\sigma^e(\lambda_N) = \{\sigma^e(\lambda_{N-1}), \{W_{Nj}^e\}\} = \{\sigma^e(\lambda_{N-2}), \{W_{N-1j}^e\}, \{W_{Nj}^e\}\} = \ldots = \{\{W_{1j}^e\}, \ldots, \{W_{Nj}^e\}\}$, $\sigma^d(\lambda_N) = \{\sigma^d(\lambda_{N-1}), \{W_{Nj}^d\}\} = \{\sigma^d(\lambda_{N-2}), \{W_{N-1j}^d\}, \{W_{Nj}^d\}\} = \ldots = \{\{W_{1j}^d\}, \ldots, \{W_{Nj}^d\}\}$. A progressive multi-stage training framework may achieve this goal.

Assume there is a set of initial weight coefficients $\{W_{1j}^e(0)\}, \ldots, \{W_{Nj}^e(0)\}$ and $\{W_{1j}^d(0)\}, \ldots, \{W_{Nj}^d(0)\}$. These initial weight coefficients can be randomly initialized according to some distribution. They can also be pre-trained using some pre-training dataset. In an embodiment, the weight updating module 410 learns a set of model weights $\{\tilde{W}_{1j}^e\}, \ldots, \{\tilde{W}_{Nj}^e\}$ and $\{\tilde{W}_{1j}^d\}, \ldots, \{\tilde{W}_{Nj}^d\}$ through a weight update process using regular back-propagation using training dataset $S_{tr}$, by optimizing the R-D loss of Equation (1) targeting a hyperparameter $\lambda_N$. In another embodiment, this weight update process can be skipped and $\{\tilde{W}_{1j}^e\}, \ldots, \{\tilde{W}_{Nj}^e\}$ and $\{\tilde{W}_{1j}^d\}, \ldots, \{\tilde{W}_{Nj}^d\}$ are directly set to be the initial values $\{W_{1j}^e(0)\}, \ldots, \{W_{Nj}^e(0)\}$ and $\{W_{1j}^d(0)\}, \ldots, \{W_{Nj}^d(0)\}$.

Now assume that the current model instance with weight coefficients $\varphi^e(\lambda_{i-1})$ and $\varphi^d(\lambda_{i-1})$ is trained already, and the goal is to train the additional weights $\{W_{ij}^e\}$ and $\{W_{ij}^d\}$ for the hyperparameter $\lambda_i$. The adding stackable module 440 stacks the stackable DNN encoders 420A, 420B, ..., and 420N $\{W_{ij}^e\}$ and the stackable DNN decoders 430A, 430B, ..., and 430N $\{W_{ij}^d\}$ in the add stackable modules process, where $\{W_{ij}^e\}$ and $\{W_{ij}^d\}$ are initialized as $\{\tilde{W}_{ij}^e\}$ and $\{\tilde{W}_{ij}^d\}$. Then in the weight update process, the weight updating module 450 fixes the already learned weights $\varphi^e(\lambda_{i-1})$ and $\varphi^d(\lambda_{i-1})$, and updates the newly added $\{W_{ij}^e\}$ and $\{W_{ij}^d\}$ through regular back-propagation using the R-D loss of Equation (1) targeting a hyperparameter $\lambda_i$. Typical, multiple epoch iterations will be taken to optimize the R-D loss in this weight update process, e.g., until reaching a maximum iteration number or until the loss converges.

Comparing with the previous end-to-end (E2E) image compression methods, the embodiments of FIGS. 3 and 4 may include only one model instance to achieve a multi-rate compression effect with stackable nested model structures, and a training framework to learn the model instance. Accordingly, the embodiments may include a largely reduced deployment storage to achieve multi-rate compression, and a flexible framework that accommodates various types of NIC models. Further, shared computation from the nested network structure performing higher bitrate compression can be achieved by reusing the computation of lower bitrate compression, which saves computation in multi-rate compression.

Figure 5:
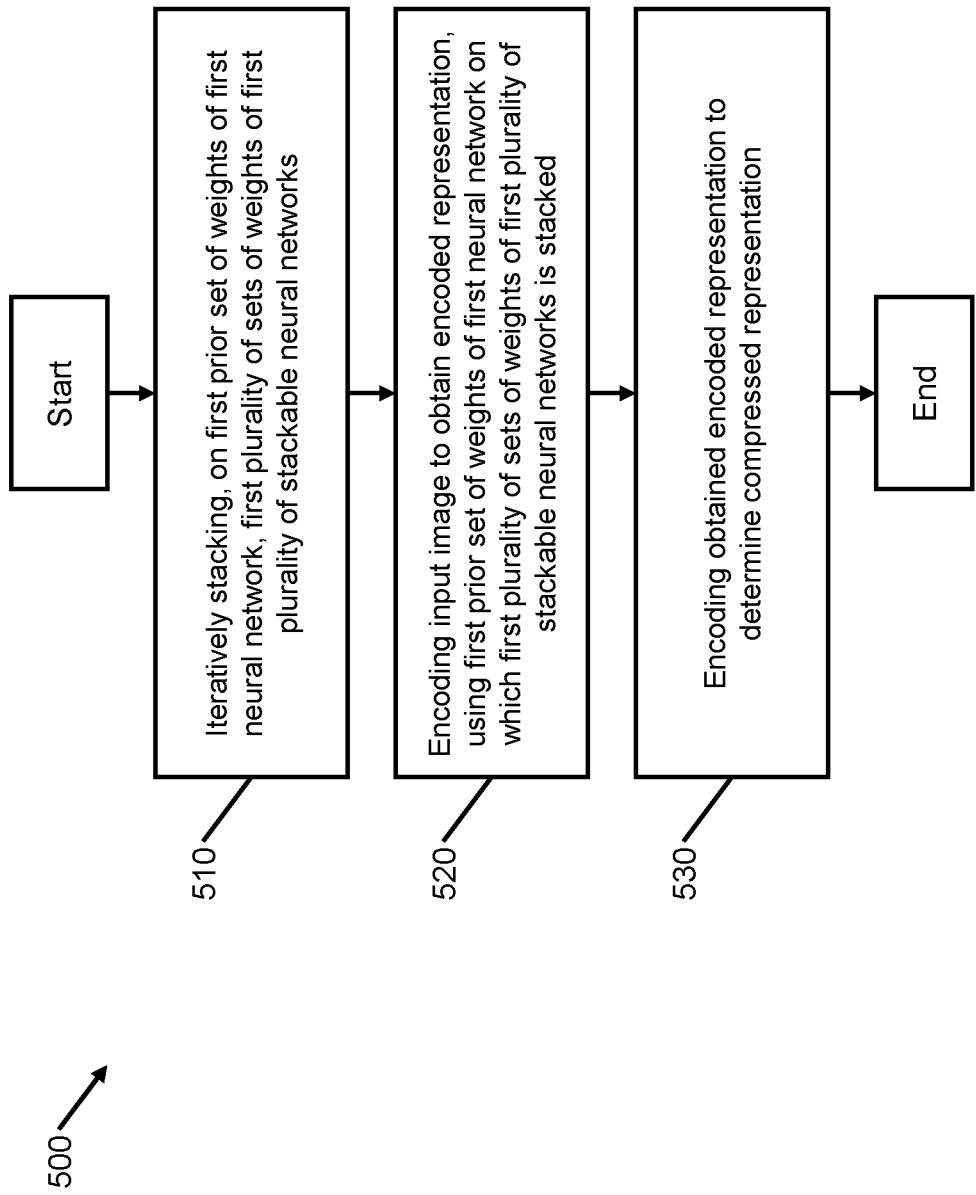
FIG. 5 is a flowchart of a method of multi-rate neural image compression with stackable nested model structures, according to embodiments.

FIG. 5 is a flowchart of a method 500 of multi-rate neural image compression with stackable nested model structures, according to embodiments.

In some implementations, one or more process blocks of FIG. 5 may be performed by the platform 120. In some implementations, one or more process blocks of FIG. 5 may be performed by another device or a group of devices separate from or including the platform 120, such as the user device 110.

As shown in FIG. 5, in operation 510, the method 500 includes iteratively stacking, on a first prior set of weights of a first neural network corresponding to a prior hyperparameter, a first plurality of sets of weights of a first plurality of stackable neural networks corresponding to a current hyperparameter. The first prior set of weights of the first neural network remains unchanged.

In operation 520, the method 500 includes encoding an input image to obtain an encoded representation, using the first prior set of weights of the first neural network on which the first plurality of sets of weights of the first plurality of stackable neural networks is stacked.

In operation 530, the method 500 includes encoding the obtained encoded representation to determine a compressed representation.

Although FIG. 5 shows example blocks of the method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel.

Figure 6:
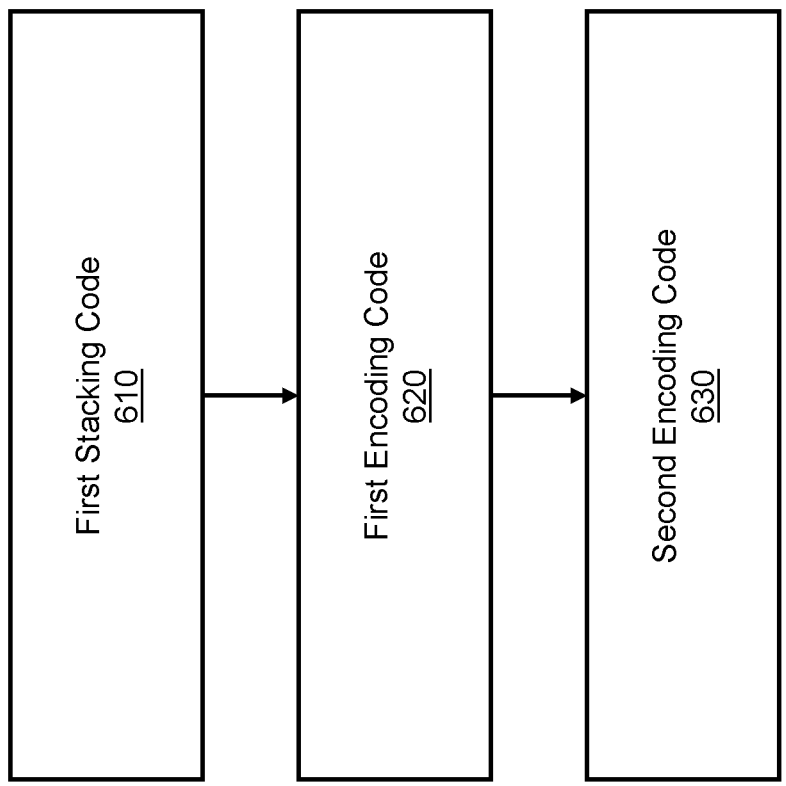
FIG. 6 is a block diagram of an apparatus for multi-rate neural image compression with stackable nested model structures, according to embodiments.

FIG. 6 is a block diagram of an apparatus 600 for multi-rate neural image compression with stackable nested model structures, according to embodiments.

As shown in FIG. 6, the apparatus 600 includes first stacking code 610, first encoding code 620 and second encoding code 630.

The first stacking code 610 is configured to cause at least one processor to iteratively stack, on a first prior set of weights of a first neural network corresponding to a prior hyperparameter, a first plurality of sets of weights of a first plurality of stackable neural networks corresponding to a current hyperparameter, wherein the first prior set of weights of the first neural network remains unchanged.

The first encoding code 620 is configured to cause the at least one processor to encode an input image to obtain an encoded representation, using the first prior set of weights of the first neural network on which the first plurality of sets of weights of the first plurality of stackable neural networks is stacked.

The second encoding code 630 is configured to cause the at least one processor to encode the obtained encoded representation to determine a compressed representation.

Figure 7:
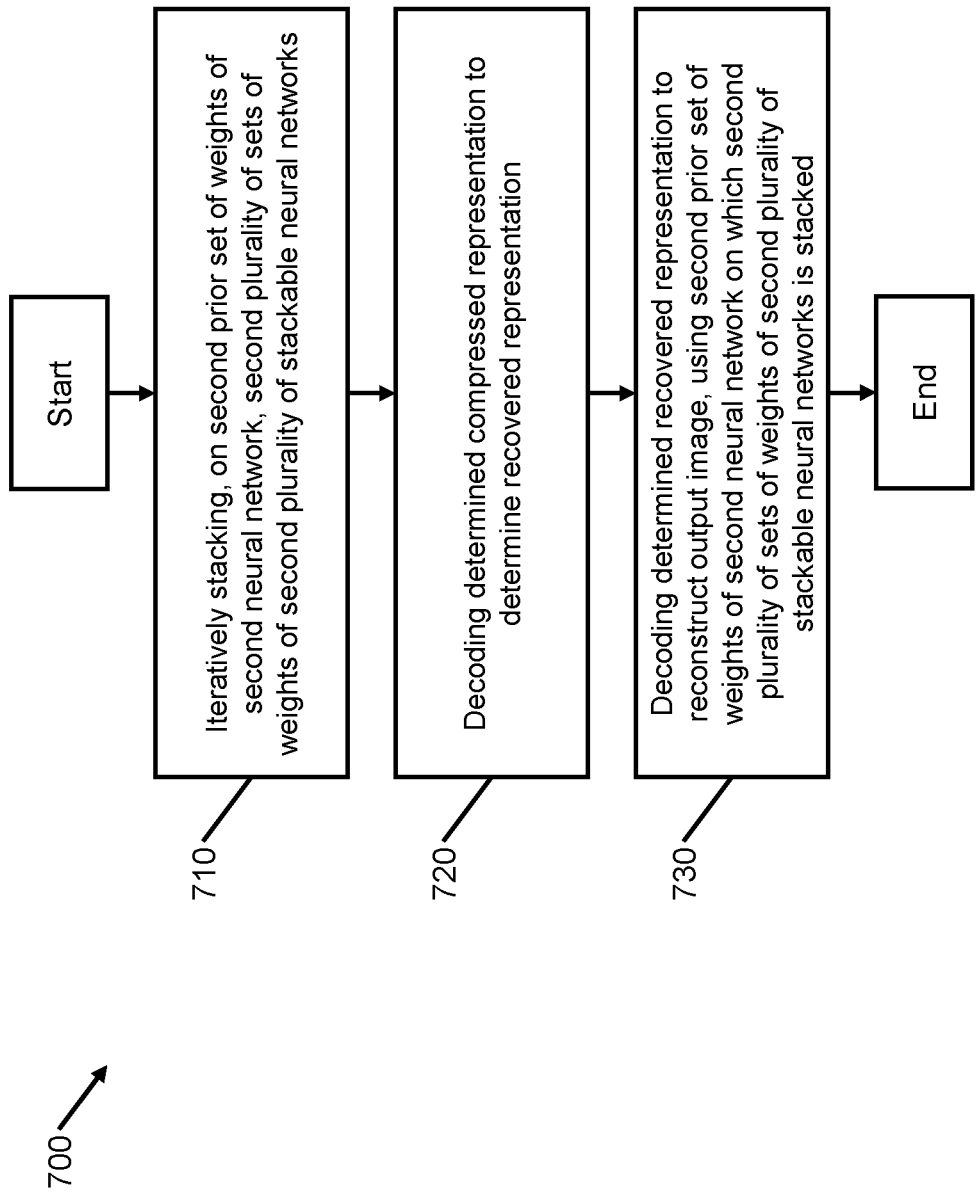
FIG. 7 is a flowchart of a method of multi-rate neural image decompression with stackable nested model structures, according to embodiments.

FIG. 7 is a flowchart of a method 700 of multi-rate neural image decompression with stackable nested model structures, according to embodiments.

In some implementations, one or more process blocks of FIG. 7 may be performed by the platform 120. In some implementations, one or more process blocks of FIG. 7 may be performed by another device or a group of devices separate from or including the platform 120, such as the user device 110.

As shown in FIG. 7, in operation 710, the method 700 includes iteratively stacking, on a second prior set of weights of a second neural network corresponding to the prior hyperparameter, a second plurality of sets of weights of a second plurality of stackable neural networks corresponding to the current hyperparameter. The second prior set of weights of the second neural network remains unchanged.

In operation 720, the method 700 includes decoding the determined compressed representation to determine a recovered representation.

In operation 730, the method 700 includes decoding the determined recovered representation to reconstruct an output image, using the second prior set of weights of the second neural network on which the second plurality of sets of weights of the second plurality of stackable neural networks is stacked.

The first neural network and the second neural network may be trained by updating a first initial set of weights of the first neural network and a second initial set of weights of the second neural network, to optimize a rate-distortion loss that is determined based on the input image, the output image and the compressed representation, iteratively stacking, on the first prior set of weights of the first neural network, the first plurality of sets of weights of the first plurality of stackable neural networks corresponding to the current hyperparameter, wherein the first prior set of weights of the first neural network remains unchanged, iteratively stacking, on the second prior set of weights of the second neural network, the second plurality of sets of weights of the second plurality of stackable neural networks corresponding to the current hyperparameter, wherein the second prior set of weights of the second neural network remains unchanged, and updating the stacked first plurality of sets of weights of the first plurality of stackable neural networks, and the stacked second plurality of sets of weights of the second plurality of stackable neural networks, to optimize the rate-distortion loss. Additional neural networks can be stacked iteratively in the same manner. The first prior set of weights of the first neural network remains unchanged throughout the iterative stacking process.

One or more of the first plurality of sets of weights of the first plurality of stackable neural networks and the second plurality of sets of weights of the second plurality of stackable neural networks may not correspond to the current hyperparameter.

Although FIG. 7 shows example blocks of the method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel.

Figure 8:
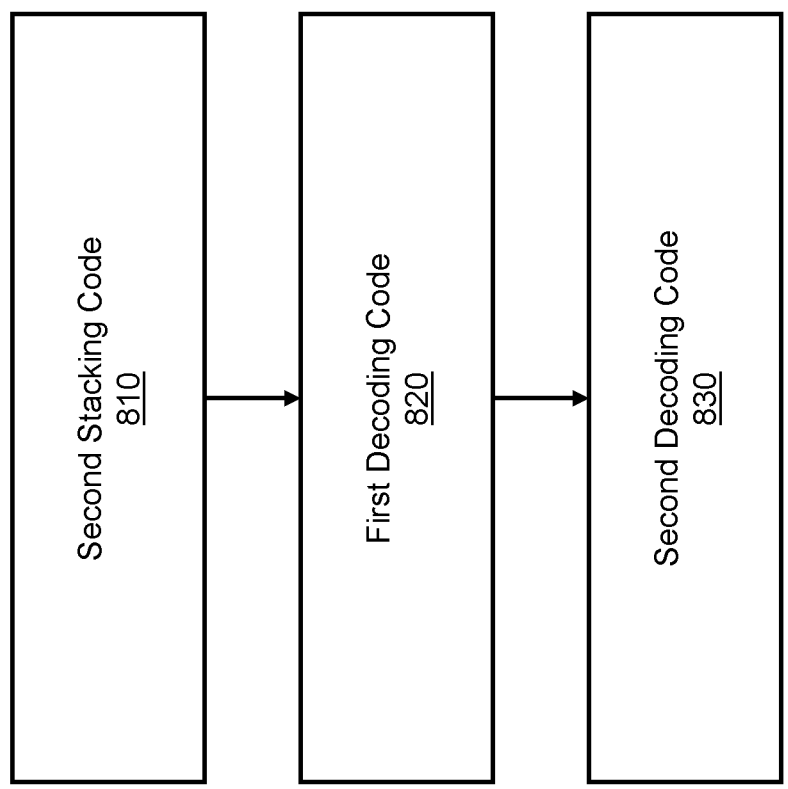
FIG. 8 is a block diagram of an apparatus for multi-rate neural image decompression with stackable nested model structures, according to embodiments.

FIG. 8 is a block diagram of an apparatus 800 for multi-rate neural image decompression with stackable nested model structures, according to embodiments.

As shown in FIG. 8, the apparatus 800 includes second stacking code 810, first decoding code 820 and second decoding code 830.

The second stacking code 810 is configured to cause the at least one processor to iteratively stack, on a second prior set of weights of a second neural network corresponding to the prior hyperparameter, a second plurality of sets of weights of a second plurality of stackable neural networks corresponding to the current hyperparameter, wherein the second prior set of weights of the second neural network remains unchanged.

The first decoding code 820 is configured to cause the at least one processor to decode the determined compressed representation to determine a recovered representation.

The second decoding code 830 is configured to cause the at least one processor to decode the determined recovered representation to reconstruct an output image, using the second prior set of weights of the second neural network on which the second plurality of sets of weights of the second plurality of stackable neural networks is stacked.

The first neural network and the second neural network may be trained by updating a first initial set of weights of the first neural network and a second initial set of weights of the second neural network, to optimize a rate-distortion loss that is determined based on the input image, the output image and the compressed representation, iteratively stacking, on the first prior set of weights of the first neural network, the first plurality of sets of weights of the first plurality of stackable neural networks corresponding to the current hyperparameter, wherein the first prior set of weights of the first neural network remains unchanged, iteratively stacking, on the second prior set of weights of the second neural network, the second plurality of sets of weights of the second plurality of stackable neural networks corresponding to the current hyperparameter, wherein the second prior set of weights of the second neural network remains unchanged, and updating the stacked first plurality of sets of weights of the first plurality of stackable neural networks, and the stacked second plurality of sets of weights of the second plurality of stackable neural networks, to optimize the rate-distortion loss.

One or more of the first plurality of sets of weights of the first plurality of stackable neural networks and the second plurality of sets of weights of the second plurality of stackable neural networks may not correspond to the current hyperparameter.

The methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of multi-rate neural image compression with stackable nested model structures, the method being performed by at least one processor, and the method comprising:
   iteratively stacking, on a first prior set of weights of a first neural network corresponding to a prior hyperparameter, a first plurality of sets of weights of a first plurality of stackable neural networks corresponding to a current hyperparameter, wherein the first prior set of weights of the first neural network remains unchanged;
   encoding an input image to obtain an encoded representation, using the first prior set of weights of the first neural network on which the first plurality of sets of weights of the first plurality of stackable neural networks is stacked; and
   encoding the obtained encoded representation to determine a compressed representation.

2. The method of claim 1, further comprising:
   iteratively stacking, on a second prior set of weights of a second neural network corresponding to the prior hyperparameter, a second plurality of sets of weights of a second plurality of stackable neural networks corresponding to the current hyperparameter, wherein the second prior set of weights of the second neural network remains unchanged;
   decoding the determined compressed representation to determine a recovered representation; and
   decoding the determined recovered representation to reconstruct an output image, using the second prior set of weights of the second neural network on which the second plurality of sets of weights of the second plurality of stackable neural networks is stacked.

3. The method of claim 2, wherein the first neural network and the second neural network are trained by updating a first initial set of weights of the first neural network and a second initial set of weights of the second neural network, to optimize a rate-distortion loss that is determined based on the input image, the output image and the compressed representation.

4. The method of claim 3, wherein the first neural network and the second neural network are further trained by iteratively stacking, on the first prior set of weights of the first neural network, the first plurality of sets of weights of the first plurality of stackable neural networks corresponding to the current hyperparameter, wherein the first prior set of weights of the first neural network remains unchanged.

5. The method of claim 4, wherein the first neural network and the second neural network are further trained by iteratively stacking, on the second prior set of weights of the second neural network, the second plurality of sets of weights of the second plurality of stackable neural networks corresponding to the current hyperparameter, wherein the second prior set of weights of the second neural network remains unchanged.

6. The method of claim 5, wherein the first neural network and the second neural network are further trained by updating the stacked first plurality of sets of weights of the first plurality of stackable neural networks, and the stacked second plurality of sets of weights of the second plurality of stackable neural networks, to optimize the rate-distortion loss.

7. The method of claim 2, wherein one or more of the first plurality of sets of weights of the first plurality of stackable neural networks and the second plurality of sets of weights of the second plurality of stackable neural networks do not correspond to the current hyperparameter.

8. An apparatus for multi-rate neural image compression with stackable nested model structures, the apparatus comprising:
- at least one memory configured to store program code; and
- at least one processor configured to read the program code and operate as instructed by the program code, the program code comprising:
  - first stacking code configured to cause the at least one processor to iteratively stack, on a first prior set of weights of a first neural network corresponding to a prior hyperparameter, a first plurality of sets of weights of a first plurality of stackable neural networks corresponding to a current hyperparameter, wherein the first prior set of weights of the first neural network remains unchanged;
  - first encoding code configured to cause the at least one processor to encode an input image to obtain an encoded representation, using the first prior set of weights of the first neural network on which the first plurality of sets of weights of the first plurality of stackable neural networks is stacked; and
  - second encoding code configured to cause the at least one processor to encode the obtained encoded representation to determine a compressed representation.

9. The apparatus of claim 8, wherein the program code further comprises:
- second stacking code configured to cause the at least one processor to iteratively stack, on a second prior set of weights of a second neural network corresponding to the prior hyperparameter, a second plurality of sets of weights of a second plurality of stackable neural networks corresponding to the current hyperparameter, wherein the second prior set of weights of the second neural network remains unchanged;
- first decoding code configured to cause the at least one processor to decode the determined compressed representation to determine a recovered representation; and
- second decoding code configured to cause the at least one processor to decode the determined recovered representation to reconstruct an output image, using the second prior set of weights of the second neural network on which the second plurality of sets of weights of the second plurality of stackable neural networks is stacked.

10. The apparatus of claim 9, wherein the first neural network and the second neural network are trained by updating a first initial set of weights of the first neural network and a second initial set of weights of the second neural network, to optimize a rate-distortion loss that is determined based on the input image, the output image and the compressed representation.

11. The apparatus of claim 10, wherein the first neural network and the second neural network are further trained by iteratively stacking, on the first prior set of weights of the first neural network, the first plurality of sets of weights of the first plurality of stackable neural networks corresponding to the current hyperparameter, wherein the first prior set of weights of the first neural network remains unchanged.

12. The apparatus of claim 11, wherein the first neural network and the second neural network are further trained by iteratively stacking, on the second prior set of weights of the second neural network, the second plurality of sets of weights of the second plurality of stackable neural networks corresponding to the current hyperparameter, wherein the second prior set of weights of the second neural network remains unchanged.

13. The apparatus of claim 12, wherein the first neural network and the second neural network are further trained by updating the stacked first plurality of sets of weights of the first plurality of stackable neural networks, and the stacked second plurality of sets of weights of the second plurality of stackable neural networks, to optimize the rate-distortion loss.

14. The apparatus of claim 9, wherein one or more of the first plurality of sets of weights of the first plurality of stackable neural networks and the second plurality of sets of weights of the second plurality of stackable neural networks do not correspond to the current hyperparameter.

15. A non-transitory computer-readable medium storing instructions that, when executed by at least one processor for multi-rate neural image compression with stackable nested model structures, cause the at least one processor to:
- iteratively stack, on a first prior set of weights of a first neural network corresponding to a prior hyperparameter, a first plurality of sets of weights of a first plurality of stackable neural networks corresponding to a current hyperparameter, wherein the first prior set of weights of the first neural network remains unchanged;
- encode an input image to obtain an encoded representation, using the first prior set of weights of the first neural network on which the first plurality of sets of weights of the first plurality of stackable neural networks is stacked; and
- encode the obtained encoded representation to determine a compressed representation.

16. The non-transitory computer-readable medium of claim 15, wherein the instructions, when executed by the at least one processor, further cause the at least one processor to:
- iteratively stack, on a second prior set of weights of a second neural network corresponding to the prior hyperparameter, a second plurality of sets of weights of a second plurality of stackable neural networks corresponding to the current hyperparameter, wherein the second prior set of weights of the second neural network remains unchanged;
- decode the determined compressed representation to determine a recovered representation; and
- decode the determined recovered representation to reconstruct an output image, using the second prior set of weights of the second neural network on which the second plurality of sets of weights of the second plurality of stackable neural networks is stacked.

17. The non-transitory computer-readable medium of claim 16, wherein the first neural network and the second neural network are trained by updating a first initial set of weights of the first neural network and a second initial set of weights of the second neural network, to optimize a rate-distortion loss that is determined based on the input image, the output image and the compressed representation.

18. The non-transitory computer-readable medium of claim 17, wherein the first neural network and the second neural network are further trained by iteratively stacking, on the first prior set of weights of the first neural network, the first plurality of sets of weights of the first plurality of stackable neural networks corresponding to the current hyperparameter, wherein the first prior set of weights of the first neural network remains unchanged.

19. The non-transitory computer-readable medium of claim 18, wherein the first neural network and the second neural network are further trained by iteratively stacking, on the second prior set of weights of the second neural network, the second plurality of sets of weights of the second plurality of stackable neural networks corresponding to the current hyperparameter, wherein the second prior set of weights of the second neural network remains unchanged.

20. The non-transitory computer-readable medium of claim 19, wherein the first neural network and the second neural network are further trained by updating the stacked first plurality of sets of weights of the first plurality of stackable neural networks, and the stacked second plurality of sets of weights of the second plurality of stackable neural networks, to optimize the rate-distortion loss.

* * * * *